(12) United States Patent
Vieira et al.

(10) Patent No.: US 11,006,651 B2
(45) Date of Patent: May 18, 2021

(54) EMULSION STABILIZATION METHOD

(71) Applicant: NESTEC S.A., Vevey (CH)

(72) Inventors: Joselio Batista Vieira, York (GB); Jwanro Husson, Notre Dame d'Oe (FR); Bettina Wolf, East Leake (GB); Joanne Gould, Nottingham (GB)

(73) Assignee: Societe des Produits Nestle S.A., Vevey (CH)

( * ) Notice: Subject to any disclaimer, the term of this patent is extended or adjusted under 35 U.S.C. 154(b) by 104 days.

(21) Appl. No.: 14/356,811

(22) PCT Filed: Nov. 7, 2012

(86) PCT No.: PCT/EP2012/072066
§ 371 (c)(1),
(2) Date: May 7, 2014

(87) PCT Pub. No.: WO2013/068425
PCT Pub. Date: May 16, 2013

(65) Prior Publication Data
US 2014/0302220 A1    Oct. 9, 2014

(30) Foreign Application Priority Data

Nov. 7, 2011    (EP) .................................... 11188128

(51) Int. Cl.
*A23G 3/48*    (2006.01)
*A23D 7/005*    (2006.01)
(Continued)

(52) U.S. Cl.
CPC ......... *A23D 7/0053* (2013.01); *A23D 7/0056* (2013.01); *A23G 1/30* (2013.01);
(Continued)

(58) Field of Classification Search
CPC .... A23G 2200/08; A23G 9/322; A23G 3/343; A23G 9/48; A23D 7/0053; A23D 7/011; A23D 7/015; A23P 20/11; A23L 1/0055
See application file for complete search history.

(56) References Cited

U.S. PATENT DOCUMENTS 2,493,732 A    1/1950    Whittingham et al.
4,431,682 A *  2/1984    Smith .................... A23G 3/343
                                                         426/565
(Continued)

FOREIGN PATENT DOCUMENTS

CN    103750418    4/2014
EP    1759591      3/2007
(Continued)

OTHER PUBLICATIONS

Huizen, Jennifer, "What are monoglycerides and are they safe?", https://www.medicalnewstoday.com/articles/321912, May 25, 2018, pp. 1-11.*

(Continued)

*Primary Examiner* — Anthony J Weier
(74) *Attorney, Agent, or Firm* — K&L Gates LLP

(57) ABSTRACT

The present invention relates to the use of cocoa particles as the emulsifier system for the stabilization of a water-in-oil or oil-in-water emulsion. In another aspect there is now provided a confectionery product having cocoa particles as the emulsifying agent that does not contain any synthetic or artificial emulsifiers, and to methods for producing such confectionery product.

8 Claims, 3 Drawing Sheets

Day 1

Day 3

Day 6

(51) Int. Cl.
*A23G 3/34* (2006.01)
*A23G 1/30* (2006.01)
*A23G 3/36* (2006.01)
*A23L 29/10* (2016.01)

(52) U.S. Cl.
CPC .............. *A23G 3/346* (2013.01); *A23G 3/36* (2013.01); *A23G 3/48* (2013.01); *A23L 29/10* (2016.08); *A23V 2002/00* (2013.01)

(56) References Cited

U.S. PATENT DOCUMENTS

| | | | |
|---|---|---|---|
| 4,948,600 A | 8/1990 | Zumbe et al. | |
| 4,980,193 A * | 12/1990 | Tuason et al. | |
| 5,185,175 A * | 2/1993 | Loh | A23G 1/042 |
| | | | 426/631 |
| 5,190,786 A * | 3/1993 | Anderson | A23G 1/047 |
| | | | 426/631 |
| 5,556,659 A | 9/1996 | De Pedro et al. | |
| 2007/0048431 A1* | 3/2007 | Budwig | A23D 7/0053 |
| | | | 426/602 |
| 2008/0206426 A1* | 8/2008 | Rousset | A23G 1/30 |
| | | | 426/576 |
| 2008/0241335 A1* | 10/2008 | Rey | A23G 1/30 |
| | | | 426/575 |
| 2009/0291170 A1* | 11/2009 | Rousset | A23D 7/0053 |
| | | | 426/101 |
| 2010/0203202 A1* | 8/2010 | Quessette | A23G 9/32 |
| | | | 426/324 |
| 2010/0215811 A1* | 8/2010 | Favre | A23D 9/00 |
| | | | 426/94 |
| 2011/0091636 A1* | 4/2011 | Elleman | A23D 7/003 |
| | | | 426/602 |
| 2012/0177801 A1* | 7/2012 | Norton | A23G 1/32 |
| | | | 426/575 |

FOREIGN PATENT DOCUMENTS

| | | | | |
|---|---|---|---|---|
| EP | 1875810 | | 1/2008 | |
| EP | 2589297 A1 * | | 5/2013 | ............. A23G 3/346 |
| WO | 03/017774 A1 | | 3/2003 | |
| WO | 2006093459 | | 9/2006 | |
| WO | 2008025803 | | 3/2008 | |
| WO | 2009/040341 A1 | | 4/2009 | |
| WO | 2008/058297 A2 | | 5/2009 | |
| WO | 2010146350 | | 12/2010 | |
| WO | WO 2010146350 A1 * | | 12/2010 | ............. A23G 1/32 |

OTHER PUBLICATIONS

Li et al., "Effect of Food Emulsifiers on Aroma Release", https://www.mdpi.com/1420-3049/21/4/511, Apr. 22, 2016, pp. 1-17.*
Bernard P. Binks "Particles as Surfactants—Similarities and Differences" Current Opinion in Colloid & Interface Science, 2002, vol. 7, pp. 21-41.
Chinese Office Action for Application No. 201280054310.0, dated Apr. 8, 2016, 9 pages.
Horiba Instruments, Inc.; "Particle size result intepretation: number vs. volume distributions"; guidebook; 2012; 4 pages.
Eric Dickinson; "Current Opinion in Colloid & Interface Science"; Elsevier Ltd.; journal; 2009; 10 pages.
Dr. W. Rostagno; "Chocolate particle size and its organoleptic influence"; The Manufacturing Confectioner; 1969; vol. 49, No. 5; Issn: 0163-4364; 7 pages.
S. T. Beckett; "Industrial Chocolate Manufacture and Use"; Blackie Academic & Professional; 1994; 3 pages.
Unknown; "Experimental report on the particle size of Cadbury Bourneville cocoa powder"; Opposition against EP2775862.
European Office Action for related European Application No. EP2775862; report dated Jun. 21, 2017.
Wayne et al., "Phase behaviour of monoglyceride/water systems", Journal of the Chemical Society, Faraday Transactions, Royal Society of Chemistry, Issue 15, 1993, Abstract, 2 pages.
Vaclavik et al., "Essentials of Food Science", 3rd Edition, Springer, 2008, 8 pages.
"The De Zaan Manual", Cocoa, 2006, 3 pages.
Kieran, "Hot Chocolate for a Cold Day", Ice Cream Ireland, Mar. 4, 2006, 12 pages.
Submission in Opposition Proceedings for EP Application No. 12781126.3, submitted Oct. 3, 2018; (32 pages).
Submission in Opposition Proceedings for EP Application No. 12781126.3, submitted Oct. 4, 2018; (2 pages).
U.S. Non-Final Office Action for U.S. Appl. No. 15/157,642 dated Sep. 18, 2019.

* cited by examiner

250 µm

EMULSION STABILIZATION METHOD

CROSS REFERENCE TO RELATED APPLICATIONS

The present application is a National Stage of International Application No. PCT/EP2012/072066, filed on Nov. 7, 2012, which claims priority to European Patent Application No. 11188128.0, filed Nov. 7, 2011, the entire contents of which are being incorporated herein by reference.

FIELD OF THE INVENTION

The present invention relates to the field of emulsions, more particularly to the stabilisation of emulsions by cocoa particles.

BACKGROUND OF THE INVENTION

Emulsions are widely used in food technology, for instance as a means to improve the nutritional profile of food products by enabling fat content reduction, and/or the incorporation of water soluble nutrients and flavourings. Emulsions are normally obtained with the aid of different molecular emulsifying agents like emulsifiers, proteins or amphiphilic polymers (also called stabilizers). These ingredients are indispensable to the manufacture of stable commercially acceptable emulsion based products. Efficient stabiliser and emulsifier systems already exist, but these are often based on chemically modified ingredients. Emulsifiers and stabilizers are generally considered as additives which under many countries' health regulations must be declared in the product label by their respective E-numbers and some are considered "synthetic" ingredients, i.e. obtained by chemical processing. There is a growing demand from consumers for products which are free from artificial additives or so-called "E numbers".

Thus there is a need for replacing synthetic or artificial emulsifiers with natural emulsifier systems that can provide the necessary tensioactive properties whilst not compromising on the product quality.

Natural ingredients with emulsifying properties are known, but they are usually not as efficient as synthetic emulsifiers and/or present other drawbacks.

In particular, egg yolk has been known for a long time for its emulsifying properties. EP 2185003 describes a stabiliser system for frozen confectioneries comprising egg yolk as natural emulsifier associated with starch and citrus fibers. However, the use of egg yolk is considerably limited due to the stringent processing conditions required for sanitary reasons, and the storage conditions for required for non-cooked products. Also for many food products it is not desired to have egg yolk as an ingredient. Also the use of egg yolk is limited in some cases due to its allergen character.

Quillaia is also known for its emulsifying properties. However, this plant contains saponins which are toxic for humans at certain concentrations.

Proteins are known to have some emulsifying properties. However, generally their use must be declared on food labels and are therefore seen as additives by the consumer.

It is now well established in the scientific literature that solid particles may also be employed to stabilize emulsions (see for instance Bernard P. Binks, Current Opinion in Colloid & Interface Science, 7 (2002), 21-41). By using solid particles, the concentration of conventional emulsifying agents can be reduced and in some cases, emulsifying agents can even be completely replaced. Until now, most of the particles selected to produce particle-stabilized emulsions have been synthetic (polymer lattices, silica, metal oxides, polymeric microgel particles, etc.). The use of naturally occurring stabilizers represents an interesting extension, However only very few naturally occurring stabilizers have been described in the literature. F. Leal-Calderon et al., Current Opinion in Colloid & Interface Science 13 (2008) 217-227 mentions the use of bacteria and cowpea mosaic virus. More recently naturally occurring spore particles of Lycopodium clavatum have also been shown to act as efficient stabilizers for emulsions (Bernard P. Binks et al., "Naturally occurring spore particles behavior at fluid interfaces and in emulsions", Langmuir 2005; 21:8161-7).

So far stabilising particles described in the literature are mostly non food grade and to be able to stabilise emulsions they normally require some "activation", i.e. chemical modification, pH adjustment or combination with conventional emulsifiers or chemical additives. WO 2009/040341 described the use of food-grade gelled nanoparticles to stabilised emulsions. However, although the gelled particles are food-grade they would still be required to be labeled by the associated E-number of the polysaccharide used to obtained the gelled particles, and also require chemical processing in their production.

Accordingly there is an ongoing need to provide efficient solutions to answer this important demand for natural emulsifier systems.

It is an object of the present invention to provide a natural emulsifier system which can replace synthetic emulsifiers in food applications.

It would be advantageous to provide an emulsifier system which can replace synthetic emulsifiers in particular in the manufacture of confectionery products, while not compromising on the product quality.

SUMMARY OF THE INVENTION

It has surprisingly been found by the inventors that naturally-occurring particles sourced from cocoa can be used to replace conventional emulsifiers to effectively stabilise emulsions.

Accordingly in one aspect the present invention encompasses the use of cocoa particles as the emulsifier system for the stabilization of a water-in-oil or oil-in-water emulsion.

Advantageously the cocoa-particle stabilized emulsions of the invention do not require the addition of any other emulsifier.

In another aspect there is now provided a confectionery product consisting of a stable emulsion comprising from 0.1 to 10% wt/wt of cocoa particles as the emulsifying agent. Advantageously the confectionery product is free from synthetic or artificial emulsifiers or structuring agents.

In another aspect there is provided a process for preparing a confectionery product in the form of an emulsion, comprising the steps of:
(a) Mixing ingredients of the aqueous phase
(b) Mixing ingredients of the fat phase
(c) Dispersing the cocoa particles in one or both of the aqueous phase or the fat phase
(d) Homogenizing the two phases to form an emulsion.

Advantageously the present invention makes possible the preparation of food products based on emulsions, and particularly confectionery products, which do not contain any additives, or non-natural ingredients. Advantageously the cocoa particle stabilised emulsions of the present invention do not require the addition of any emulsifiers. Advantageously the cocoa-particle emulsifier system of the present invention can replace synthetic emulsifiers in particular in the manufacture of confectionery products, and does not need to be declared on the product label.

DETAILED DESCRIPTION OF THE INVENTION

Figure 1:
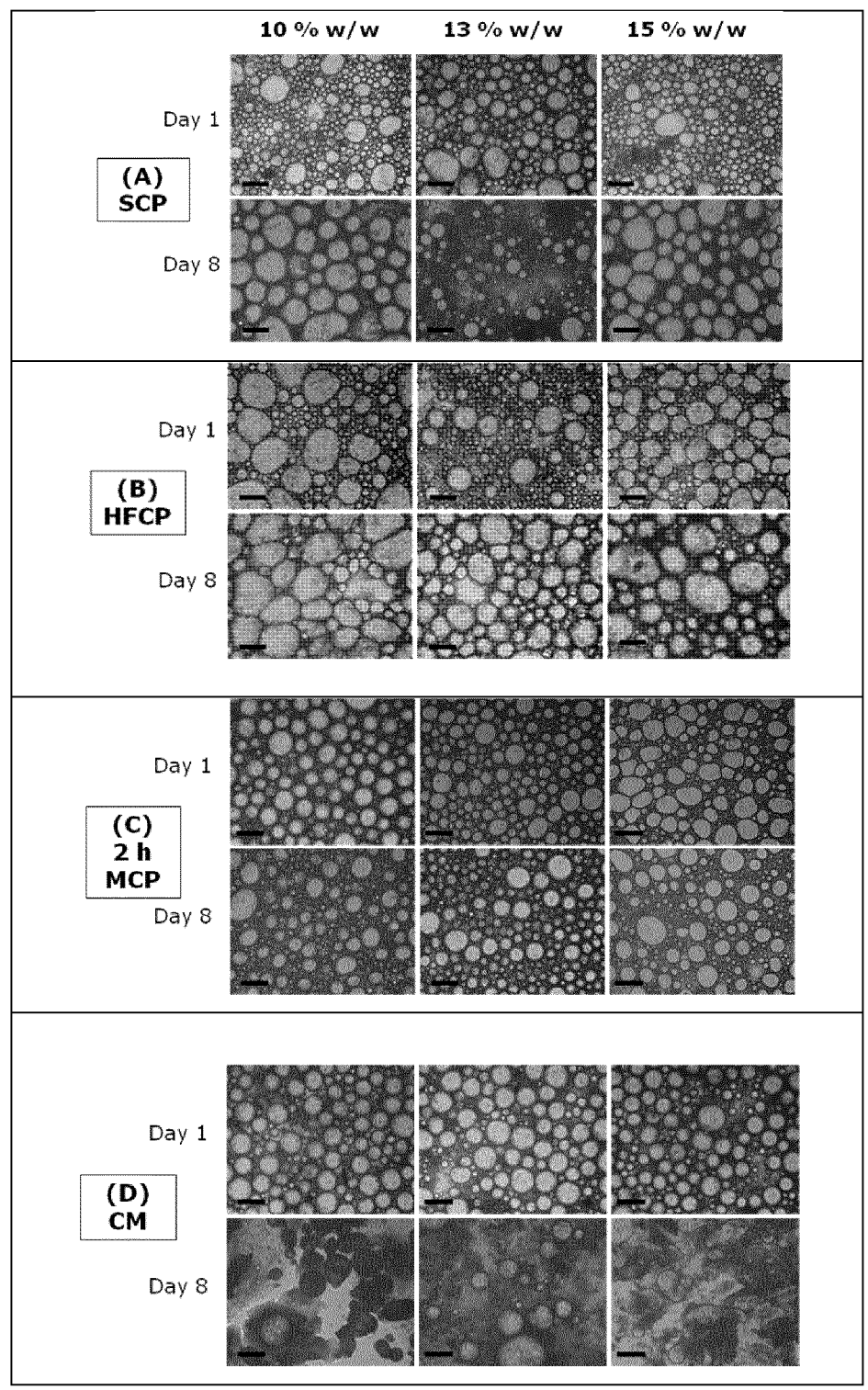
FIG. 1 shows micrographs of cocoa particle-stabilised emulsions according to embodiments of the invention prepared using different sources of cocoa solids and at varying cocoa solids content.

Unless otherwise specified % in the present description correspond to wt %.

The present invention concerns the use of cocoa particles as the emulsifier system for the stabilization of a water-in-oil or oil-in-water emulsion. By "emulsifier system" is to be understood at least one ingredient with tensoactive properties.

In the present description, what is meant by "natural ingredients" is ingredients of natural origin. These include ingredients which come directly from the field etc. They may also include ingredients which are the result of a physical or microbiological/enzymatic process (e.g. extraction, fermentation etc.). However, they do not include ingredients which are the result of a chemical modification process.

In the present description, "food-ingredients" refers to ingredients of natural origin containing nutrients that are consumed to provide nutritional support for the body.

The inventors of the present invention have surprisingly found that particles of cocoa, a naturally-occurring food-ingredient, are able to produce emulsions with good stability without the need for the addition of emulsifiers, or structuring agents or other stabilisers.

Unlike the stabilising particles described in the literature, the cocoa particles according to the invention are obtained from food source of naturally occurring materials and require no activation to stabilise emulsions. As cocoa solids are not classed as food additives, the invention provides the important advantage of allowing the preparation of products that are free of additives, e.g. free of the so-called "E-numbers" associated with chemical emulsifiers.

Surprisingly cocoa particles have been found to effectively stabilise emulsions without the need for any synthetic or artificial emulsifier. Surprisingly cocoa particles have been found to remarkably stabilise emulsions against coalescence and more surprisingly can stabilise emulsions also against creaming and sedimentation.

Suitably the cocoa particles can have a particle size (otherwise referred to as a mean particle diameter) with an average particle size of from about 1 to about 200 microns, preferably of from about 1 to about 100 microns. In some embodiments the particles have an average particles size of from about 1 to about 50 microns, such as of from about 5 to about 40 microns. In certain embodiments the particles have an average particles size of from about 10 to about 20 microns. In other embodiments the particles have an average particles size of less than 10 microns, even less than 5 microns, such as from about 0.1 to about 5 microns.

Without wishing to be bound by any theory it is believed that the emulsifying capacity of the cocoa particles, results from the adsorption of cocoa particles to the oil/water interface. It is surprising that the cocoa particles have been found to exhibit the observed sufficiently good emulsion stabilisation effects without requiring the addition of any other emulsifier, stabilising agent, or structuring agent, and without requiring any activation of the particles.

Conventional emulsifiers include for instance sugar esters, polyglycerol fatty acid esters, polyglycerol polyricinoleate (PGPR), polysorbates (polyoxyethylene sorbitan esters), monoglycerides/diglycerides and their derivatives, sodium stearoyl lactylate (SSL), phospholipids, glycerol monooeleate, amongst others. Advantageously, the present invention uses cocoa particles to stabilize emulsions without the need of addition of such emulsifiers or stabilizing agents.

In the present specification, the term "structuring agent" is understood as a component having the capacity to bind and/or structure water. Structuring agents include polysaccharides and/or proteins, such as carrageenans, pectins, gellan, gelatines, guar, acacia gum, sodium alginate, xanthan gum or globular proteins such as those contained in a whey protein isolate, an egg white protein isolate, a soy protein isolate or other globular protein isolates from an animal or vegetal source. Advantageously the present invention enables the preparation of food products, in particular confectionery products, based on emulsions without the need for such structuring agents.

Advantageously the present invention enables the preparation of food products, in particular confectionery products, based on emulsions that are free of artificial or synthetic emulsifiers. Advantageously the present invention enables the preparation of food products that are free of monoglycerides, diglycerides and their derivatives. Advantageously the present invention enables the preparation of food products, in particular confectionery products, based on emulsions that are free of glycerol monooleate, polyglycerol esters and polyglycerol esters of polyrincinoleic acid.

Surprisingly the inventors of the present invention have found that cocoa particles are able to produce emulsions with exceptional stability, without the need for emulsifiers, structuring agents or other stabilising agents.

Unlike the stabilising particles described in the literature, cocoa particles are obtained from a food source of naturally occurring materials and require no activation to stabilise emulsions. As cocoa solids are not classed as food additives, the invention provides the important advantage of allowing the preparation of products that are free of additives, e.g. free of the so-called "E-numbers".

The source and/or the fat content of the cocoa solids is not important. The cocoa particles may be obtained from different sources of cocoa solids, such as cocoa liquor, cocoa powder, cocoa fibre and/or any other source of cocoa solids. Cocoa particles with any fat content are envisaged.

The inventors have surprisingly found that emulsions obtained with different cocoa solids were surprisingly stable, regardless the cocoa solid fat content. Whereas conventionally it would have been expected that varying the fat content in the cocoa solids (e.g. from 0.1 to about 60%) would have significant effect on the hydrophilicity of the cocoa particles and therefore on any efficiency to stabilise emulsions as it would modify their wetting properties.

Cocoa particles with any fat content are envisaged, for instance cocoa solids having a fat content of from about 0.1% to about 55%. In some embodiments the cocoa particles are defatted cocoa powder. Defatted cocoa powders can have a fat content of less than about 1%, typically defatted cocoa powders have a fat content of from about 0.1 to less than 10%. In some embodiments the cocoa particles are a standard cocoa powder. Standard cocoa powders generally have a fat content of about 10% to about 15%, e.g. about 10% to about 12%. In some embodiments the cocoa particles are high fat cocoa powder. High fat cocoa powder can generally have a fat content of about 20% or higher, e.g. from about 20% to about 25%, e.g. from about 20 to about 22%. In some embodiments the cocoa particles are cocoa fibres. Cocoa fibres typically have a fat content around 5%. In some embodiments the cocoa particles are cocoa solids of cocoa liquor. These cocoa solids have a relatively high fat content, typically a fat content of at least 50%, such as a fat content of about 50% to about 55%.

Cocoa particles have been found to stabilise emulsion remarkably against coalescence. Even more surprisingly cocoa particles have been found to produce emulsions with significant reduction of sedimentation of cocoa particles. Cocoa particles are denser than water and therefore would be expected to settle down at the bottom in the absence of conventional chemical emulsifiers, stabilizing agents and/or structuring agents, however surprisingly the emulsions prepared according to the invention have good stability properties against the sedimentation of the cocoa particles. At the same time it has also surprisingly been observed that the cocoa particles remarkably stabilised the emulsions against creaming of the oil droplet phase.

Advantageously cocoa particles can be used to replace conventional emulsifiers and/or structuring agents to effectively stabilise emulsions in confectionery products.

Surprisingly the inventors of the present invention have found that cocoa particles are able to remarkably stabilise water-in-oil emulsions, as well as oil-in-water emulsion. This is particularly advantageous for applications in confectionery products. Accordingly in one preferred aspect the invention provides the use of cocoa particles as the emulsifier system for the stabilization of a water-in-oil emulsion.

According to one aspect of the invention there is provided a confectionery product consisting of a stable emulsion comprising cocoa particles as the emulsifying agent, in the absence of any synthetic or artificial emulsifiers or structuring agents.

The confectionery product consisting of an emulsion may be a chocolate, a chocolate-like (e.g. comprising cocoa butter replacers, or cocoa-butter equivalents), a chocolate spread, a chocolate sauce, a coating chocolate, a coating chocolate for ice-creams, a praline, a chocolate filling, a fudge, a chocolate cream, a refrigerated chocolate cream, an extruded chocolate product, or the like. The confectionery product may be in any conventional form, such as in the form of an aerated product, a bar, a spread, a sauce or a filling, among others. It may also be in the form of inclusions, chocolate layers, chocolate nuggets, chocolate pieces, chocolate drops, or shaped chocolates and the like. The confectionery product may further contain inclusions e.g. cereals, like expanded or toasted rice or dried fruit pieces and the like.

The amount of cocoa particles included as the emulsifier will depend on the desired properties of the emulsion product amongst other. Typically the cocoa particles are present in amount of from about 0.1 to about 20% wt/wt of the confectionery product, preferably from about 0.1 to about 10% wt/wt, e.g from about 1 to about 10% wt/wt. In a preferred embodiment the emulsifier is provided by cocoa particles, present in an amount of from about 2% to about 10% of the confectionery product.

In the present specification, the term "fat phase" is understood as including any solid and/or liquid ingredient miscible with oil or fat or that has the capacity to dissolve in oil or fat, and "aqueous phase" as including any solid and/or liquid ingredient miscible with water or that has the capacity to dissolve in water.

The confectionery product may comprise sugars. These sugars include sucrose, fructose, sugar replacers such as polyols (e.g., maltitol, lactitol, isomalt, erythritol, sorbitol, mannitol, xylitol) or bulking agents like polydextrose or other sweeteners like tagatose or high intensity sweeteners like saccharin, aspartame, acesulfame-K, cyclamate, neohesperidin, thaumathin, sucralose, alitame, neotame or any combination thereof.

The confectionery product may comprise ingredients such as flavouring agents, colorants, or milk ingredients. Typically flavouring agents are used to add flavours such as vanilla, raspberry, orange, mint, citrus, strawberry, apricot, lavender flavours, etc, and any other fruit, nutty or flower flavouring agent, among others. Milk ingredients can be liquid milk or milk powder, either full fat, partially defatted or defatted, and delactosylated or not.

In the confectionery product the fat phase is typically cocoa butter, a cocoa butter substitute, cocoa butter replacer, cocoa butter improver and/or cocoa butter equivalent, among others.

Cocoa butter substitute is a lauric fat obtained from the kernel of the fruit of palm trees obtained by fractionation and/or hydrogenation of palm kernel oil. It comprises about 55% lauric acid, 20% myristic acid and 7% oleic acid, cocoa butter substitutes cannot be mixed with cocoa butter. Cocoa butter equivalents are vegetable fats with similar chemical and physical characteristics to cocoa butter, which are obtained by blending different fractions of other fats or by interesterification, and can be used interchangeably with cocoa butter in any recipe. Cocoa butter replacers are formed by non lauric vegetable fats which may be mixed with cocoa butter but only in limited proportions: they have similar physical, but not chemical characteristics to cocoa butter. Cocoa butter replacers can be used in recipes partially based on cocoa mass or cocoa butter. Cocoa butter improvers are harder cocoa butter equivalents which are not only equivalent in their compatibility but also improve the hardness of some of the softer qualities of cocoa butter.

Advantageously the present invention allows the preparation of confectionery products based on emulsions having very good stability properties, in the absence of any added emulsifiers, structuring agents or other stabilizing agents. Advantageously the present invention allows the preparation of emulsion-based confectionery products having very good emulsion stability properties, which stabilized by cocoa particles as the emulsifying agent, without the addition of any other emulsifier and without the need for carrying out any activation step/treatment on the cocoa particles.

The emulsions stabilised with cocoa particles according to the invention can be prepared following conventional methods for the preparation of emulsions.

According to an exemplary method, in some embodiments the process for preparing a confectionery product in the form of an emulsion, comprises the steps of:

(e) Mixing ingredients of the aqueous phase;
(f) Mixing ingredients of the fat phase;
(g) Dispersing the cocoa particles in one or both of the aqueous phase or the fat phase;
(h) Homogenizing the two phases to form an emulsion.

In certain embodiments, for the preparation of an oil-in-water emulsion, the cocoa particles are dispersed in the aqueous phase, and the oil/fat phase is added to the aqueous phase, before agitation to form an emulsion. In other embodiments, for the preparation of a water-in-oil emulsion, the cocoa particles are dispersed in the oil/fat phase, and the aqueous phase is added to the oil/fat phase, before agitation to form an emulsion. Homogenization is conveniently used to provide the agitation for formation of the emulsion, however other conventional technologies are contemplated.

Advantageously the present invention makes possible the preparation of food products based on emulsions, and particularly confectionery products, which do not contain any additives, or non-natural ingredients. Advantageously the cocoa particle stabilised emulsions of the present invention do not require the addition of any emulsifiers, structuring agents or other stabilizing agents. Advantageously the cocoa particle stabilised emulsions of the present invention do not require any activation step/treatment on the cocoa particles.

The term "about," as used herein, should generally be understood to refer to both numbers in a range of numerals. Moreover, all numerical ranges herein should be understood to include each whole integer within the range.

All patent and non-patent references cited in the present application, are hereby incorporated by reference in their entirety.

The invention will now be described in further details in the following non-limiting examples.

EXAMPLES

Example 1

Preparation of Sunflower Oil-in-Water (O/W) Emulsion Stabilised with Cocoa Particles Oil in water emulsions were prepared using 20% weight purified sunflower oil as the fat phase. The aqueous phase comprised water in which different cocoa particle sources were dispersed (cocoa powder 6% wt/wt of the aqueous phase). The oil phase was slowly added onto the aqueous phase, and oil in water emulsions were prepared using a homogeniser (L5M Series, Silverson, UK) with a fine emulsor screen, operating at 8000 rpm for two minutes.

The list of cocoa powders tested is given in Table 1.

TABLE 1

List of cocoa powders tested as emulsion stabilisers. Particle size of cocoa powder measured as described below.

| Cocoa powder sample | Fat % | pH | Particle Size (d4,3) μm |
|---|---|---|---|
| DP medium brown Defatted Cocoa Powder | <1% | 7.0 ± 0.2 | 16.0 |
| SR deep dark red Defatted Cocoa Powder | <1% | 8.0 ± 0.2 | 16.0 |
| DP medium brown 10/12 Cocoa Powder | 10-12% | 7.0 ± 0.2 | 12.0 |
| DSR deep dark red 10/12 Cocoa Powder | 10-12% | 7.0 ± 0.2 | 14.0 |
| SR deep dark red 10/12 Cocoa Powder | 10-12% | 8.0 ± 0.2 | 13.0 |
| Cocoa powder alkalized 10/12% fat POR10G9 | 10-12% | 7.7 ± 0.2 | 12.0 |
| Cocoa powder alkalized 10/12% fat D11S | 10-12% | 8.0 ± 0.2 | 12.0 |
| DP medium brown 20/22 Cocoa Powder | 20-22% | 7.0 ± 0.2 | 13.0 |
| Micronised cocoa fibre | <5% | 6.0 ± 0.3 | |

Particle Size Measurement of Cocoa Solids

Particle size distributions were measured at a low angle laser diffraction particle size analyser (LS 13 320 series Beckman Coulter, Inc, UK) utilising the Fraunhofer optical model. Average sizes were assessed using $d_{4,3}$, the volume mean. Cocoa solids were measured with water as a dispersant.

Homogenous emulsions were obtained with all cocoa powders. The droplet size of the emulsions was measured following the procedure described below. Emulsion samples were stored at room temperature for 5 days and the droplet size was then measured to check the stability of the emulsions.

Droplet Size Measurement of Cocoa Particle-Stabilised W/O Emulsions

Emulsion droplet size distributions were measured at a low angle laser diffraction particle size analyser (LS 13 320 series Beckman Coulter, Inc, UK). Average sizes were assessed using $d_{4,3}$, the volume mean. Emulsion measurements were performed with water as a dispersant and the Fraunhofer optical model was used. The emulsion droplet size was monitored over a period of storage, and change in droplet diameter has been used as a measure of stability. No change or a small increase in droplet size shows a stable emulsion whereas as a significant increase in droplet size is evidence of droplet coalescence and therefore an unstable emulsion.

The results are given in Table 2 and show that the emulsions are very stable against coalescence.

TABLE 2

Droplet size of cocoa powder-stabilised emulsions measured at day 1 (when they were prepared) and day 6 (5 days after storage at ambient temperature).

| | Droplet Size, $d_{4,3}$ (μm) | |
|---|---|---|
| Cocoa powder-stabilised Emulsions | Day 1 | Day 6 |
| Alkalised Defatted Cocoa Powder DP | 16.0 | 15.0 |
| Alkalised Defatted Cocoa Powder SR | 16.0 | 15.0 |
| Cocoa powder alkalized 10/12% fat POR10G9 | 12.0 | 12.0 |
| Alkalised 10/12% fat Cocoa Powder DSR | 14.0 | 14.0 |
| Alkalised 10/12 Cocoa Powder SR | 13.0 | 15.0 |
| Alkalised 10/12% fat Cocoa Powder DP | 12.0 | 12.0 |
| Cocoa powder alkalized 10/12% fat D11S | 12.0 | 12.0 |
| Alkalised 20/22% fat Cocoa Powder DP | 13.0 | 12.0 |
| Ficao micronised cocoa fibre | 39.0 | 40.0 |

Example 2

Preparation of Corn Oil-in-Water (O/W) Emulsion Stabilised with Cocoa Particles

Different sources of cocoa solids were first dispersed in distilled water followed by the addition of refined corn oil (Mazola™ oil bought at local shop). Five different sources of cocoa solids were tested and details are found in Table 3. The emulsions were prepared to contain 55% w/w oil and cocoa solids varying from 10 to 15% w/w based on the total weight of the emulsion, water was the balance ingredient making up the remainder of the emulsion. The mixture was subjected to emulsification at 8,000 rpm for 4 min using a Silverson L4R mixer fitted with emulsor screen. For the emulsion containing cocoa mass the emulsification was done at 55° C. After preparation the samples were kept undisturbed at 4° C. for stability test. The stability of the samples was checked by visual observation and microscopy.

TABLE 3

Fat content and particle size of the various cocoa solids used.

| Cocoa solids source | Reference | Fat Content, % | Particle size, $d_{90}$ (μm) |
|---|---|---|---|
| Cocoa liquor | CM | 55 | not measured |
| High fat cocoa powder | HFCP | 22 | 104 |
| Standard cocoa powder | SCP | 11 | 46 |
| Standard cocoa powder | 2 hr SCP | 11 | 14 |
| Highly defatted cocoa powder | HDCP | 0.1 | 34 |

Emulsions were successfully prepared using different types of cocoa solids as listed in table 3. The reference "2 hr SCP" refers to a sample of the standard cocoa powder "SCP" which has been submitted to wet milling using a planetary micro mill (PULVERISETTE 7 classic line, Fritsch GmbH, Germany) and 20 g of 1 mm-diameter balls at 800 rpm for 2 hours. No oil separation was observed in any of the emulsion samples. The degree of creaming varied with the source of cocoa solids. Overall the emulsion samples were stable to creaming. After 7 days storage at 4° C., the emulsion samples remained stable, no oil separation was observed and the degree of creaming remained almost unchanged.

The emulsion samples were analysed under an optical microscope (Leitz Microscope Company) fitted with a 20× magnification lens and a digital camera (megapixel Fireware PL-A662, Pixelink), and the micrographs of the cocoa particle-stabilised emulsions, prepared using different sources of cocoa solids and at varying cocoa solids content, were taken on the first day of manufacture (Day 1) and 7 days after the day of preparation (Day 8). The micrographs taken on day 1 and day 8 are displayed in FIG. 2.

On day 1, the droplet size distribution of the emulsions does not show any significant variation with an increase in the cocoa solids content (i.e. from 10% w/w cocoa solids content to 15% w/w) cocoa solids content). The droplets of the emulsion containing 2 hr SCP and Cocoa liquor appeared to give the most consistent droplet size distribution. After 8 days storage at 4° C., the pictures show only slight evolution of the droplet size distribution of the emulsions. The samples containing cocoa powder 2 hr SCP (C) appeared the most stable as only a very small change in the droplet size was observed. It is noted that the samples containing cocoa liquor (D) showed crystallisation of cocoa butter during storage at 4° C.

Figure 2:
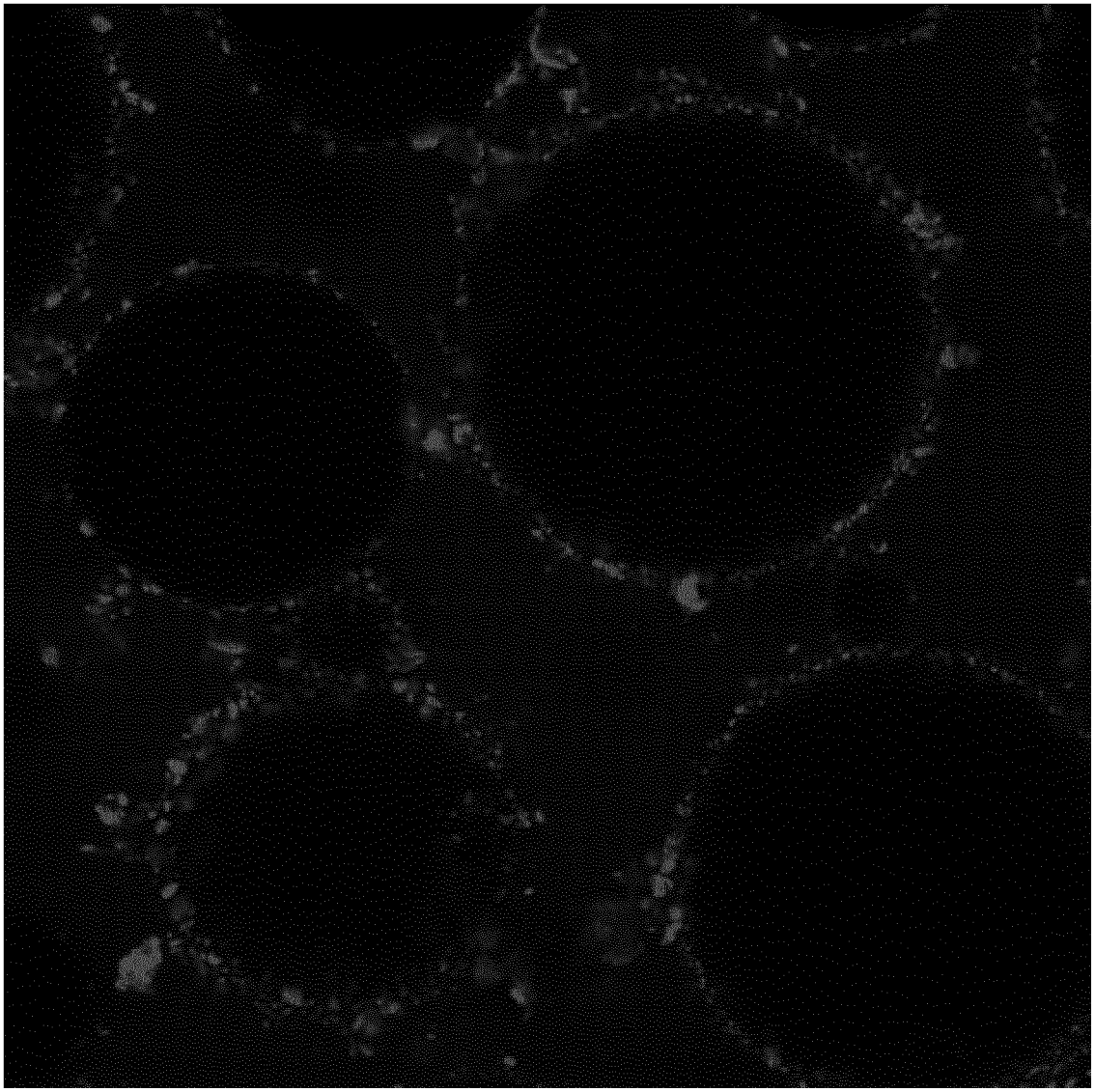
FIG. 2 shows a confocal fluorescence image of an oil-in-water emulsion stabilised by cocoa particles according to one embodiment of the invention.

Confocal fluorescence images of emulsion stabilised with cocoa powder were obtained on a Leica TCS SP Confocal Scanning Laser Microscope (CSLM) at a wavelength of 488 nm. FIG. 2 shows a representative CLSM image of a coarse emulsion stabilized by cocoa powder. The confocal fluorescence image of FIG. 2 shows cocoa particles covering the oil droplets. It is very clear from the CLSM image that cocoa powder is present as insoluble particles in the aqueous phase. Consequently, it is believed that the good emulsifying capacity of the cocoa powder results from the adsorption of cocoa particles to the oil/water interface, i.e. that the systems act as Pickering emulsions stabilised by cocoa particles.

Example 3

Preparation of Water-in-Sunflower Oil (W/O) Emulsion Stabilised with Cocoa Particles Water in oil emulsions were prepared with 95% purified sunflower oil. Standard Cocoa powder "SCP" (fat content 11%, particle size 46 μm was dispersed in oil phase (6% of oil phase) and water as the aqueous phase (balance w/w) was added slowly onto the oil phase, and oil in water emulsions were prepared using a homogeniser (L5M Series, Silverson, UK) with no screen, operating at 3000 rpm for two minutes. The A homogenous emulsion was obtained which was then stored at room temperature for stability check.

Figure 3:
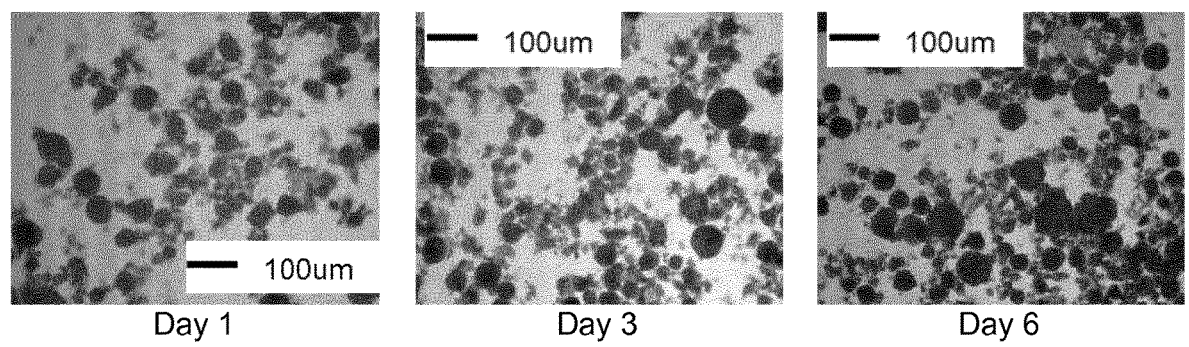
FIG. 3 shows micrographs of a water-in-oil emulsion stabilised by cocoa particles according to one embodiment of the invention on storage.

The emulsion sample was analysed under the microscope as in Example 2, on day 1 (day of preparation), day 3 and day 6, and the micrographs are displayed in FIG. 4. Even on day 6 (after storage for 5 days after preparation) the emulsion remained stable. From FIG. 3 it is seen that only a very slight evolution of the droplet size distribution was observed of the emulsion after 5 days storage (day 6).

The invention claimed is:

1. A method for the stabilization of a water-in-oil or oil-in-water emulsion, the method comprising:
    dispersing cocoa particles within the water-in-oil or oil-in-water emulsion, wherein a content of the cocoa particles is 10-15% w/w based on a total weight of the water-in-oil or oil-in-water emulsion, and
    the cocoa particles are used as an emulsifier system stabilizing the water-in-oil or oil-in-water emulsion in the absence of any additional emulsifier, in the absence of any structuring agent, and in the absence of egg yolk.

2. The method according to claim 1, wherein the cocoa particles have a mean particle size of from 1 to 50 μm.

3. The method according to claim 1, wherein the water-in-oil or oil-in-water emulsion is a water-in-oil emulsion.

4. The method according to claim 1, wherein the water-in-oil or oil-in-water emulsion is for a confectionery product.

5. A process for preparing a confectionery product, the process comprising:
    mixing ingredients of an aqueous phase;
    mixing ingredients of a fat phase;
    dispersing cocoa particles in one or both of the aqueous phase and the fat phase, wherein a content of the cocoa particles is 10-15% w/w based on a total weight of the aqueous phase and the fat phase; and
    mixing the aqueous and the fat phases together to form a mixture and homogenizing the mixture to form an emulsion,
    wherein the cocoa particles are used as an emulsifier system stabilizing the emulsion in the absence of any additional emulsifier, in the absence of any structuring agent, and in the absence of egg yolk.

6. A process for preparing a confectionery product, the process comprising:
    preparing an oil-in-water emulsion using a step selected from the group consisting of (1) dispersing cocoa particles in water as an aqueous phase, and adding an oil phase to the aqueous phase, and (2) dispersing cocoa particles in an oil phase, and adding water to the oil phase, wherein a content of the cocoa particles is 10-15% w/w based on a total weight of the aqueous phase and the oil phase, and the cocoa particles are used as an emulsifier system stabilizing the emulsion in the absence of any additional emulsifier, in the absence of any structuring agent, and in the absence of egg yolk.

7. The process according to claim 5, wherein the emulsion is a water-in-oil emulsion.

8. The process according to claim 5, wherein the emulsion is an oil-in-water emulsion.

* * * * *